United States Patent

[11] 3,609,722

[72] Inventor George E. Zenzefilis
27 Los Vientos, Camarillo, Calif. 93010

[21] Appl. No. 816,874
[22] Filed Mar. 19, 1969
[45] Patented Sept. 28, 1971

[54] CENTER SEALING DATA DISC CASSETTE AND PROCESSING MACHINE
12 Claims, 16 Drawing Figs.

[52] U.S. Cl. .......... 340/174.1 C, 179/100.2 Z, 206/62 P
[51] Int. Cl. .......... G11b 23/04, G11b 25/04, B65d 85/54
[50] Field of Search .......... 179/100.2 Z; 274/4, 4 H; 340/174.1 C; 206/62 P

[56] References Cited

UNITED STATES PATENTS 3,526,884 9/1970 Buslik et al. .......... 179/100.2 Z
3,529,301 9/1970 Hiruta .......... 340/174.1 C
3,416,150 12/1968 Lindberg .......... 179/100.2

*Primary Examiner*—Bernard Konick
*Assistant Examiner*—Robert S. Tupper
*Attorney*—Harry W. Brelsford

ABSTRACT: A cassette for a data disc has a sliding shutter that opens a window for access to the data disc held in the cassette. The cassette has a central opening exposing the center of the disc so that the disc can be mounted on a spindle, and this opening is sealed from dust by compressible seals that also act to hold the disc in the cassette out of touch with other parts of the cassette. There is provided a data processing machine upon which the cassette may be mounted or removed for recording or takeoff of information and wherein the final stages of mounting the cassette open the shutters and compress the seals, and the first stages of removal close the shutters and seals.

INVENTOR.
GEORGE E. ZENZEFILIS
BY H. W. Brelsford
ATTORNEY

INVENTOR.
GEORGE E. ZENZEFILIS
BY H. W. Brelsford
ATTORNEY

INVENTOR.
GEORGE E. ZENZEFILIS

BY H.W. Brelsford
ATTORNEY

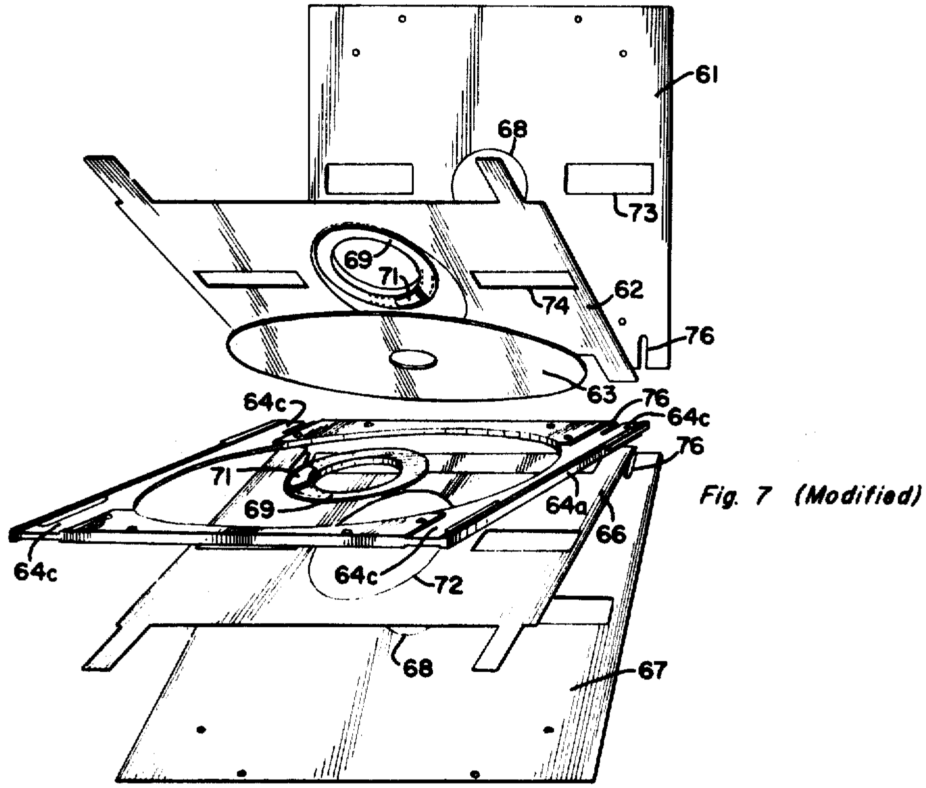
Fig. 7 (Modified)
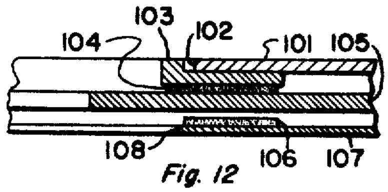
Fig. 12
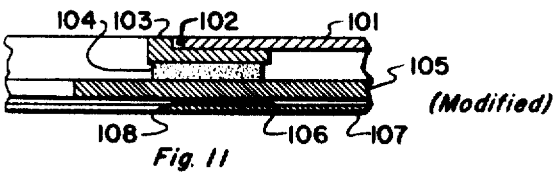
Fig. 11 (Modified)
INVENTOR.
GEORGE E. ZENZEFILIS
BY H. W. Brelsford
ATTORNEY

PATENTED SEP 28 1971

3,609,722

INVENTOR
GEORGE E. ZENZEFILIS

BY H. W. Brelsford
ATTORNEY

CENTER SEALING DATA DISC CASSETTE AND PROCESSING MACHINE

This invention relates to data discs for the memory of computers and has particular reference to a handling mechanism for such discs for the recording, storage and retrieval of data.

It is well known that the recording discs used by machines serving as memories for computers, and in particular in the cases where the discs must be removable for interchangeability or for access to more discs or for other reasons, must be handled with the greatest of care. Scratches on the highly polished and sensitive surfaces cannot be tolerated. No dust or lint can fall upon these surfaces as this leads to scratching even when handled carefully, and additionally the minute and delicate read-off mechanisms are damaged by such debris. The filing of discs in dust proof and sealed cabinets has been tried with unsatisfactory results. Even when the discs are dust free, the placing of the discs over the spindle on the read out machines calls for the greatest of care to avoid damage.

I have devised a cassette and a machine for recording or reading out of discs that insures absolute freedom from dust and debris and furthermore can be operated by unskilled persons without damaging the disc. The recording and reading out machine will be referred to as a disc processing machine. My cassette completely encloses the disc and opens a long window for a recording or read out mechanism, only when the disc is positioned on the processing machine and is in the final stage of mounting on the machine spindle. It is well known that in the great majority of cases where the rate of information into the disc or out from the disc is constant, the maximum storage is achieved when only the outer one-half part, radially, is used. Therefore it is important to have a window extending to the outer edge of the disc. I employ a disc loading fixture incorporating a simple and fool proof cassette loading frame that assures exact positioning of the disc over the machine spindle. Additionally, I seal the spindle area of the disc from dust and debris by a dust tight closure that is opened only when the disc is actually seated on the spindle. I have devised a spindle lock that not only secures the disc accurately in place but also opens these dust tight closures at the spindle so that the disc can rotate freely within the cassette for processing. Additionally, the centrifugal forces when the disc rotates will not tend to unlock the spindle-lock but on the contrary will tend to secure the disc more firmly. Furthermore, my dust seals at the spindle area of the cassette are used to space the disc in the cassette when the cassette is removed from the processing machine, so that the disc does not touch any other part of the cassette, except possibly the outer edge of the disc might touch the cassette, which is unimportant.

It is therefore a general object of my invention to provide an improved data handling mechanism including a dust free cassette for computer data discs and a disc processing machine that opens the cassette dust covers when the disc is ready for processing.

Other objects, advantages and features of the invention will be apparent in the following description and claims in which:

FIG: 1 is a three dimensional view of a processing machine for data discs showing the operating inserting a cassette onto the processing machine.

FIG. 7 is an exploded view of a modified form of the cassette showing the different parts that make up the cassette.

FIG. 11 is a fragmentary cross-sectional view of a modified form of cassette at the region of the internal opening.

FIG. 12 is a fragmentary cross-sectional view of the structure of FIG. 11 when the disc has been placed on the spindle and lifted away from a lower cushion.

Figure 1:
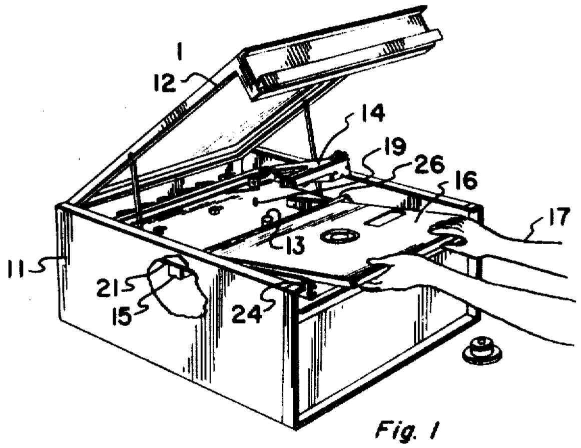

Referring to FIG. 1, there is illustrated a disc processing machine 11 which may have hinged cover 12 which is lifted for access to the machine. The processing machine may have a deck 21 through which protrudes a central spindle 13 over which the disc inside of the cassette is fitted for processing. A suitable transducer 14 is hinged so that it may be moved out of the way for insertion. A fixed transducer 15 is secured to the under side of deck 21 for processing the bottom side of a disc. An operator may grasp a cassette 16 in his hands 17 and slide the cassette along the top of guide rails 24 and under a guide bar 26. As thus inserted into the processing machine 11, the cassette will pass over the top of the spindle 13 and will engage a pair of pins 19 (only one appearing in FIG. 1) during the final stages of insertion into the machine 11. When the cassette 16 has been positioned over the spindle 13, and the disc locked to the spindle, the hinged transducer 14 is lowered over the cassette so that it is over a window in the cassette, and the cover 12 is rotated downwardly to protect the entire machine from dust. The transducer may be of any suitable type, for example, like that of applicant's copending application Ser. No. 707,824 filed Feb. 23, 1968, now Pat. No. 3,474,687.

Figure 2:
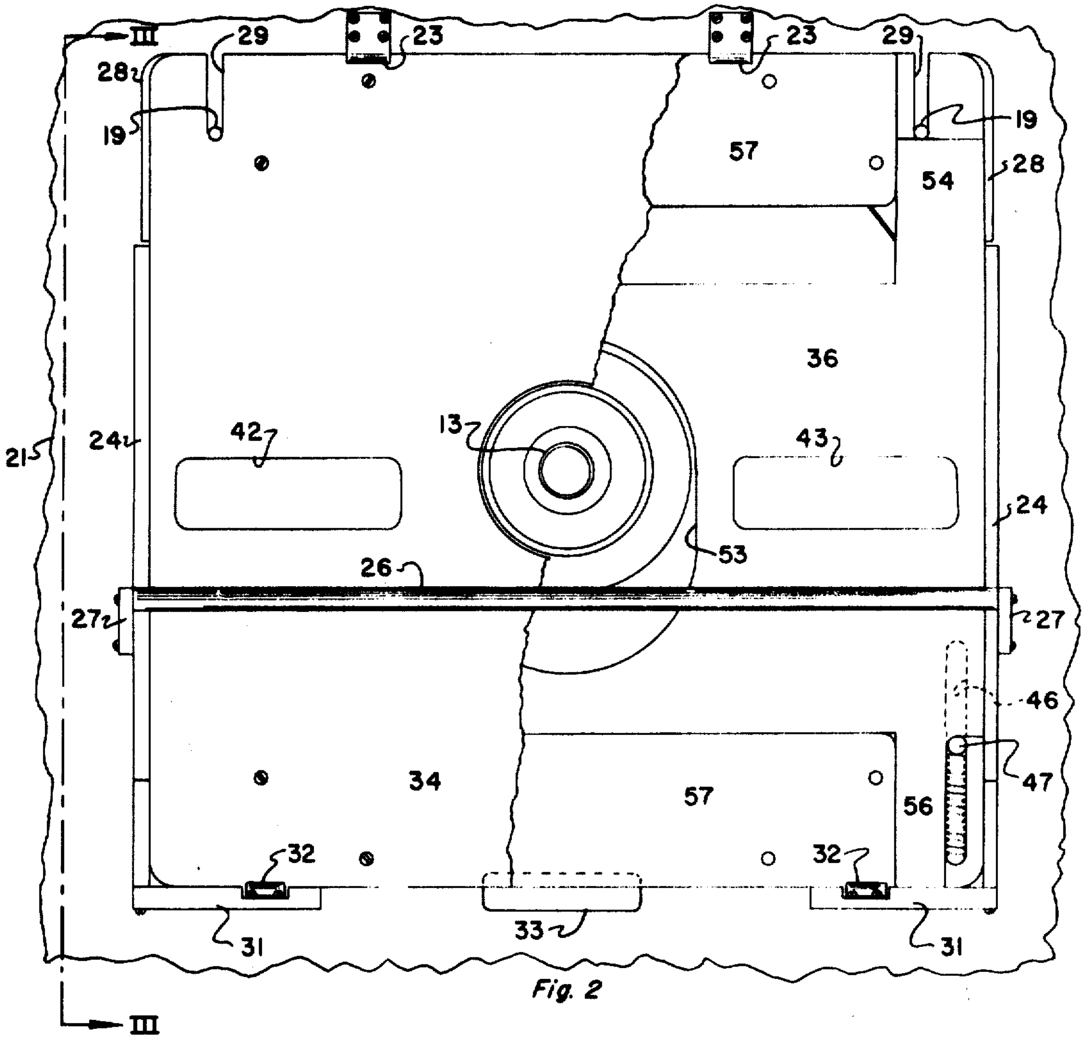
FIG. 2 is a plan view of a portion of the deck of the machine of FIG. 1 showing the cassette with the window open and being accurately positioned so that the processing machine may process the disc disposed in the cassette, and with portions of the cassette broken away to show its interior construction.
Figure 3:
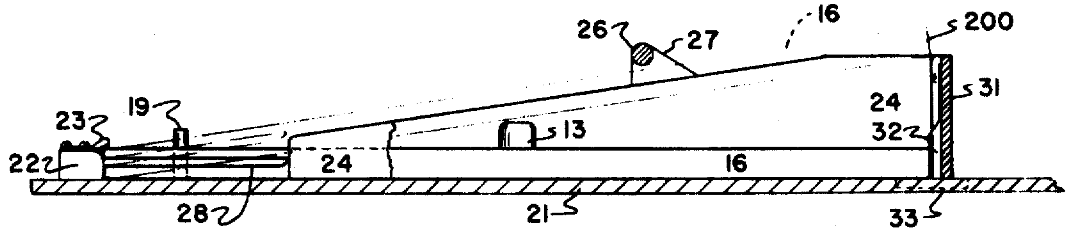
FIG. 3 is a side elevation view of part of the machine of FIG. 2 as viewed along the line III—III of FIG. 2 with portions of the cassette guide broken away to show the relationship of the cassette to the machine.

Referring now to FIGS. 2 and 3, there is shown the deck 21 through which projects the spindle 13. The deck supports the pins 19 as well as a pair of stop blocks 22, each having a resilient spring 23 mounted on the top thereof. Also secured to the deck 21 is the pair of guide rails 24 and spanned across the top of these guide rails is the guide bar 26 supported by plates 27. The stop blocks 22 are not strictly necessary as the pins 19 stop the forward motion of the cassette, but the blocks do form a convenient place for the attachment of the springs 23, and locate the cassette more positively so that it does not move forwardly.

In the upper part of FIG. 2 it will be noted that the cassette has outwardly flaring flanges 28, and these ride along the top of the guide rails 24. Shown in FIG. 3 in broken outline is the position of the cassette 16 as it slides along the top of the guide rails 24 by virtue of the cassette guide flanges 28 riding on top of these rails, and the bottom surface of the cassette riding on top of locator plates 31. The crossbar 26 limits the upward angle of insertion. It will be noted that the guide rails 24 end short of the stop 22 by an amount sufficient to allow clearance of the cassette guide flanges 28.

Referring to the top part of FIG. 2 it will be noted that the pins 19 are positioned at the bottom of slots 29 formed in the cassette, when the latter is fully inserted and seated.

Referring now to FIG. 3 it will be noted that the pins 19 are on one side of the spindle 13 and disposed on the opposite side are the cassette locator plates 31, each of which is recessed to receive a spring 32 which acts to retain the cassette 16 flat against the deck 21, and also to cushion the cassette when it drops as it leaves locator plates 31.

For removal of the cassette from the deck the deck is recessed midway between the locator of plates 31 as at 33 so that the fingers of the operator may be inserted under the cassette to lift it against the force of the springs 32.

The construction of the cassette is shown in FIGS. 2 through 6. The cassette of FIG. 7 is a slightly modified version wherein the main spacer member is differently constructed.

Referring now to FIGS. 2 through 6 it will be noted that the cassette 16 has a top stationary cover 34, a top shutter 36, a main spacer 37, a lower shutter 38, and a lower stationary cover plate 39. The main spacer 37 is considerably greater in thickness than a data disc 41 secured within the cassette. The purpose of the cassette, of course, is to protect this disc 41 from dust, dirt, and abrasion.

Figures 4, 4A, 4B:
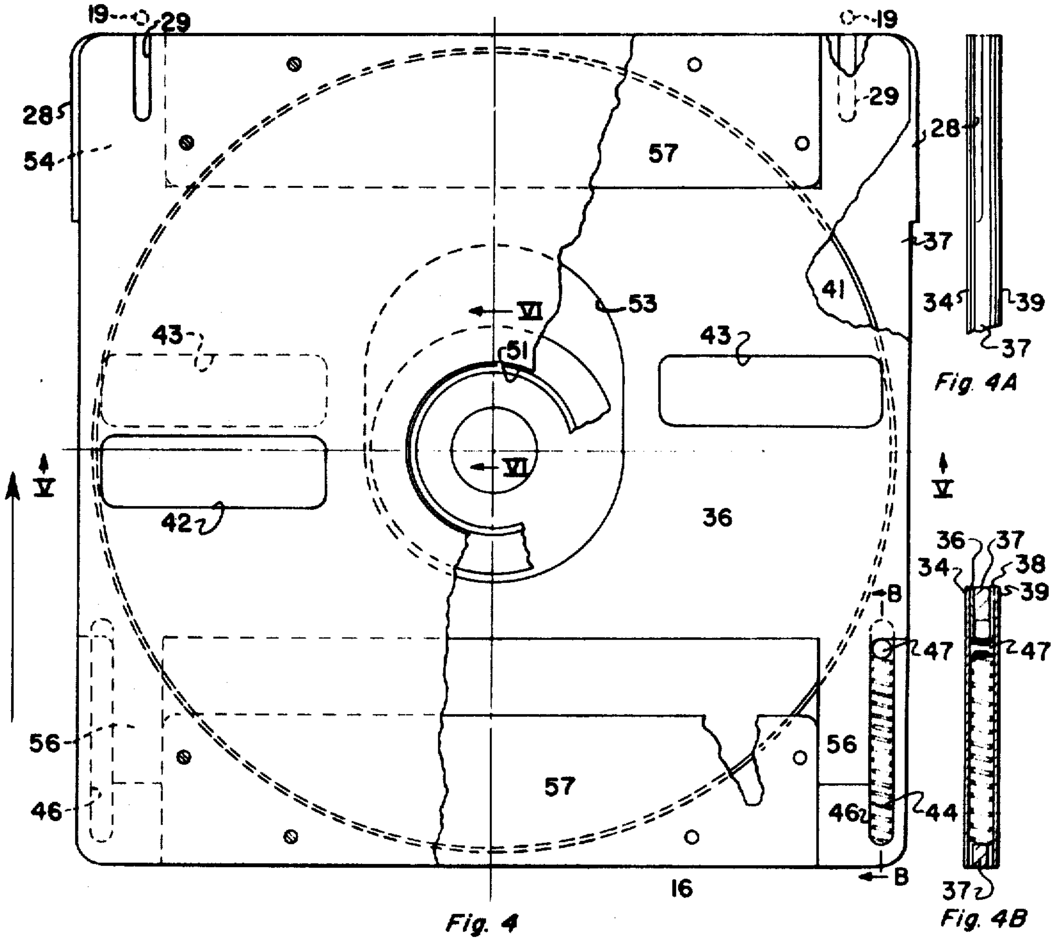
FIG. 4 is a plan view of the cassette of FIG. 2 with the shutter closed and with portions of the cassette broken away to show the interior construction.
FIG. 4A is a fragmentary side view of the cassette of FIG. 4.
FIG. 4B is a fragmentary sectional view along the line B—B of FIG. 4.

Each stationary cover 34 and 39 has two windows 42, and these are normally covered by the shutters 36 and 38, as shown in FIG. 4. Each shutter 36 and 38 has a corresponding pair of windows 43, but these are normally out of alignment with the cover windows 42, as shown in FIG. 4.

Referring now to the upper part of FIG. 4, it will be noted that the pin slots 29 are formed in the upper cover 34, the main spacer 37 and the lower cover 39. They are not formed in either of the shutters 36 or 38, and accordingly when the cassette 16 is pressed against the pins 19 these shutters are moved approximately by the distance of the length of the slots 29. This movement aligns the shutter windows 43 with the cover windows 42, permitting the transducer 14 of FIG. 1 to have access to the disc 41 located in the cassette. The shutters are normally held in the position illustrated in FIG. 4 where they close all the cover windows 42 by virtue of compression springs 44 held in slots 46 in the main spacer 37. To insure uniform pressure on both shutter blades 36 and 38 a transverse cylindrical lug 47 is disposed between the shutters and each compression spring. However, this lug could be inserted in the space between the shutters and fastened securely on them, and in this case both shutters would move together as a body.

The relationship of the shutters 36 and 38 to the cover plates 34 and 39 when the shutters are open, is illustrated best in FIG. 2. It will be noted that the shutters are pressing against the pins 19 to thereby align their holes 43 with the cover holes 42.

Figure 5:
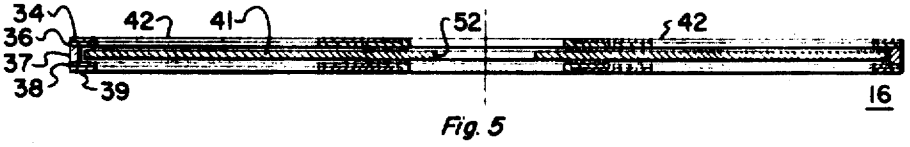
FIG. 5 is a sectional view along the line V—V of FIG. 4.
Figure 6:
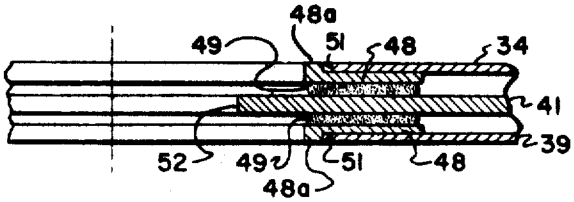
FIG. 6 is an enlarged fragmentary sectional view along the line VI—VI of FIG. 2 showing the construction of the foam rubber washers about the central opening of the cassette so that dust is excluded from the disc in this area.

It will be noted particularly in FIGS. 5 and 6 that the cassette covers 34 and 39 have a central opening 51 and that the disc 41 is exposed by this opening and the disc terminates at an interior flange or hole edge 52. It will be noted particularly in FIGS. 2 and 4 that the shutters 36 and 38 each are cut out in this central section with an elongated, or somewhat oval, hole 53 so that they do not protrude into this central section, and, also, that they do not interfere with the dust sealing-positioning washers described immediately below.

The center hole in the cover plates is sealed against dust by a composite washer construction best illustrated in FIGS. 5 and 6. Disposed between the disc 41 and each cover plate 34 and 39 is a rigid washer 48 having a transverse flange 48*a* which tends to center the washers in the central opening 51. Disposed between each washer 48 and the disc 41 is a resilient compressible washer 49 formed of foam rubber or of similar material. This composite washer 48–49 therefore seals the disc 41 at the central area and positions it in the middle of the cassette when the latter is removed from the machine.

In order to permit the shutters to slide freely between the covers 34 and 39 a suitable shutter spacer must be provided, and this structure is shown best in FIGS. 2 and 4. There it will be noted that rectangular plates 57 are placed two on each side of the disc main spacer 39, and these are slightly thicker than the thickness of the shutters.

The plates 57 also act as guides for the shutters inasmuch as the shutters have forwardly extending projections 54 which overlie the slots 29 and have rearwardly projecting extensions 56 adjacent to the coil springs 44. Both pairs of projections on each shutter are guided by these plates 53.

Simultaneously the plates 53 act as stops and restrict the motion of the shutters in both directions so that they will not protrude from the cassette. Also the plates 57 act as safety surfaces so that the disc if tilted will touch them first at an edge.

Illustrated in FIG. 7 is a modified form of the cassette wherein the main spacer has side ridges that seal against the stationary top and bottom covers so that the sliding edges of the shutters are not exposed. The cassette, FIG. 7, may have a top stationary plate 61, a top shutter 62, a data disc 63, a main spacer 64, a bottom shutter 66, and a bottom stationary cover 67. The two stationary covers 61 and 67 have a central aperture 68 which receives an upwardly turned flange on a rigid washer 69 and disposed against this washer 69 is a foam rubber washer 71, a fragment of which is shown. It will be noted that the shutters 62 and 66 each have oval-shaped openings 72 so that the shutters do not contact the washers 69 and 71 during their normal position or after they have been moved to uncover an access opening, or during this motion. It will be noted also that the main spacer 64 has thickened parallel edges 64*a* so that the stationary cover 61 and 67 may fit tightly against this edge. The other two edges of the spacer 64 are thickened at 64*b* to provide a shutter guide 64*c*. The spacer may be formed of plastic if it is desired to reduce weight and cost.

In other respects the cassette of FIG. 7 is similar to that of the prior figures, each stationary cover having windows 73 and each shutter having corresponding windows 74 that are misaligned except when the shutters are moved rearwardly by virtue of pins moving into slots 76 in each of the cover plates and also in the spacer 64. The operation of the cassette of FIG. 7 is identical to that of the prior figures.

Figure 8:
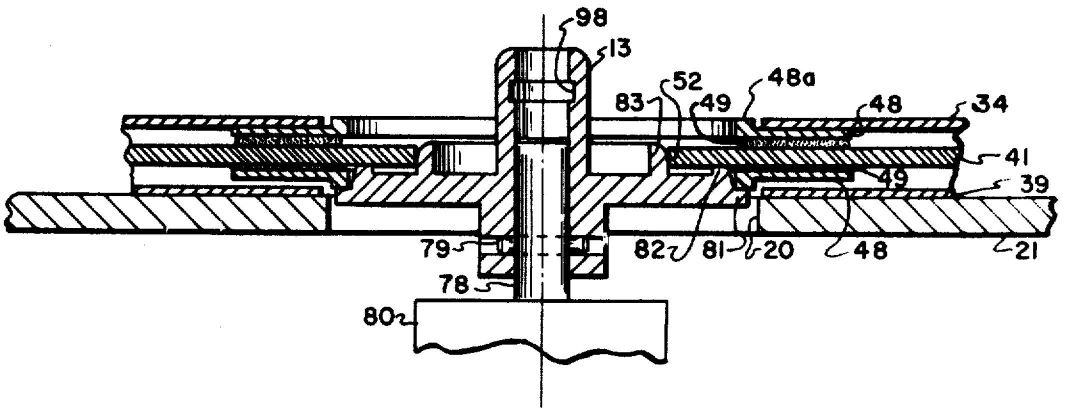
FIG. 8 is an enlarged fragmentary sectional view of the processing machine of FIG. 1 showing a cassette positioned over the spindle.
Figure 9:
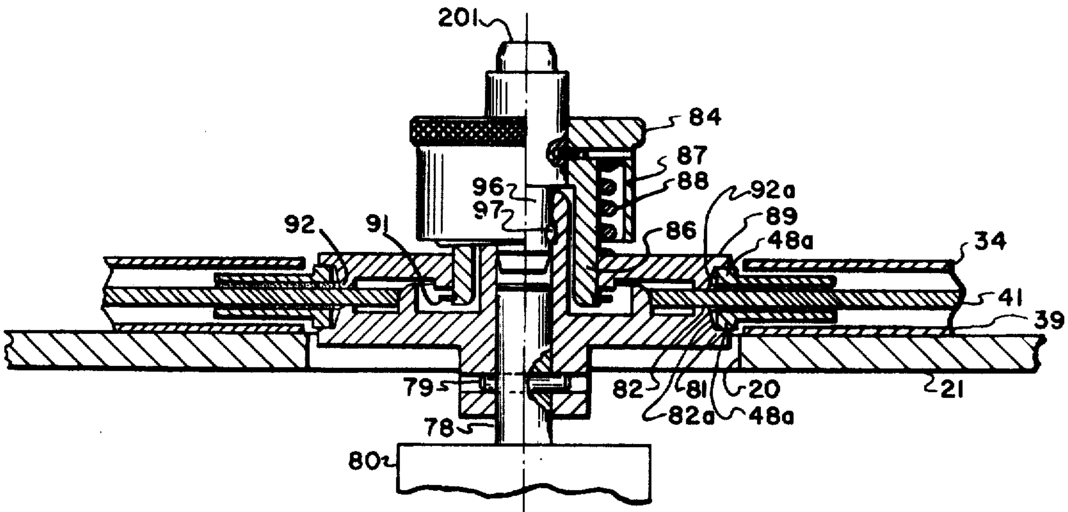
FIG. 9 is a sectional view showing the mechanism of FIG. 8 and in addition showing the compressor compressing both foam rubber washers so that the disc may rotate freely within the cassette, and simultaneously being securely attached on the spindle.
Figure 10:
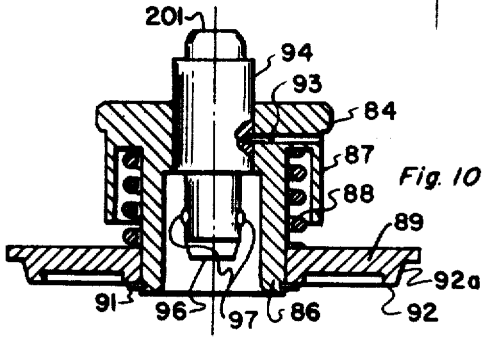
FIG. 10 is a sectional view of the compressor of FIG. 9.

Referring now to FIGS. 8, 9 and 10 there is illustrated the mechanism by which the disc is secured to the spindle so that it can rotate accurately during the processing of the data. In those figures it will be noted that the deck 21 has an opening 20 through which projects the spindle 13. The spindle is secured in any suitable manner, as by transverse pin 79, to a shaft 78 on a motor, or other driving fixture, 80 which drives the shaft and thereby the spindle 13 in rotation. The spindle 13 has a horizontal flange which has an outer annular shoulder 81, an outer transverse annular rib 82, and a circular flange 83 with curved shoulders. It will be noted that the inner flange or hole 52 of the data disc 41 closely abuts against the circular flange 83. The data disc 41 is accurately machined in the region of the interior flange or hole 52 on the disc, and the circular flange 83 against which this flange abuts and the annular rib 82 are also extremely accurately machined so that concentricity and plane of rotation of the disc 41 are held to minute tolerances for accurately recording and taking off data from the disc 41. Referring to FIGS. 3 and 8, it will be noted that as the rear edge 200 of the cassette leaves the locator plates 31, it will pivot around the blocks 22 and therefore it will approach the spindle 13 and circular flange 83 at an angle, and hence the curved shoulders of flange 83 facilitates the disc insertion.

By comparing FIG. 8 with FIG. 6 it will be noted that the lower compressible disc 49 in FIG. 8 is compressed as compared to its corresponding condition in FIG. 6. This is due to the fact that the vertical dimension between the rim 81 and the top of the deck 21 is such with respect to the vertical dimension of the cassette that the lower rigid washer 48 is lifted upwardly out of contact with the lower cassette cover 39. This is due to the weight of the disc and the cassette as a whole being great enough to compress this lower washer 49. (However, after the disc clamp is replaced the weight of the cassette becomes immaterial.)

Referring now to FIG. 9 it will be noted that the upper compressible washer 49 is also compressed. This is due to the action of a compressor 84, shown by itself in FIG. 10. This compressor of FIG. 10 is placed over the spindle 13 of FIG. 8 to form the assembly illustrated in FIG. 9. Referring especially to FIG. 10 it will be noted that the compressor 84 has an inverted cup-shaped body 86 with an outer cup spring shield 87 between which is placed a compression spring 88. This spring acts to push downwardly, in FIG. 10, a radial and apertured flange 89 that slides on the body 86 and has its downward movement limited by a snap ring 91. This apertured flange 89 has a raised rib 92 that matches in dimensions the raised rib 82 on the spindle flange, and has a conical face 92*a* similarly to a conical face 82*a* of the annular rib 82 of FIG. 8 to facilitate entrance and also to center the dust sealing and positioning washers 48, 49. This rib 92 is also accurately machined. Fastened to the cup-shaped body in member 86 by any suitable means, such as a pin 93, is a sleeve 94 within which is located a fastening stem 96.

Referring particularly to FIG. 9, it will be noted that the stem 96 fits accurately within the hollow spindle 13, so that the complete assembly of the compressor 84 will rotate concentrically with spindle 13. The stem 96 carries balls 97 which engage a counter bore groove 98 on the interior of the hollow spindle 13. The movement of the balls 97 into and out of the recess 98 is an old and well-known principle and is accomplished by manually pushing a pushbutton 201 downwardly to release the balls, whereupon the entire compressor 84 may be manually lifted upwardly.

It will be appreciated by those skilled in the art that the compressor could be held by structure other than the spindle 13, and for example, could be mounted on the cover 12 to compress the upper compressible washer 49 when the cover 12 (FIG. 1) is closed. I find the compressor easier to operate and more accurate to align by mounting it on the spindle 13.

Referring again to FIG. 9, it will be appreciated by those skilled in the art that it is not necessary for the weight of the cassette and disc to be sufficient to compress the lower compressible washer 49. If this washer is sufficiently stiff to sustain the weight of the cassette and disc, the cassette will be held slightly above the deck 21 until the compressor 84 is mounted on the spindle 13 and pushed against the disc, whereupon both compressible washers 49 would be simultaneously compressed and the cassette would fall to the deck 21. The compressor 84, accordingly, can compress both compressible washers 49 or merely one of them, as illustrated by an inspection of FIG. 8. As shown best in FIG. 9, a compression of both the washers frees the disc from mechanical contact with any of the parts of the cassette other than the washers. The disc can then be freely rotated as a unit together with the washers.

Referring to FIGS. 11 and 12, there is illustrated a modified form of seal for the center of the cassette. A top cassette cover 101 has a central opening 102. A rigid washer 103 is fitted around the opening, and a compressible elastic washer 104 is disposed between it and a data disc 105. A washer of cushion material 106 is disposed between the disc 105 and a lower cassette cover 107 having a center opening 108.

I prefer to make the cushion 106 of a resilient but not necessarily compressible material although a washer of soft metal could also serve as a cushion. Additional advantages of using a noncompressible material on the lower washer would be a more definite centering of the disc when the cassette is removed, since the top compressible material 104 then presses against the disc until the latter contacts the washer 106.

Illustrated in FIG. 12 is the position of the parts when the cassette is placed on a spindle (not shown) and the data disc 105 is lifted off of its cushion 106. This frees the bottom edge of the disc 105 from contact with the cassette, and this is accomplished by compressing somewhat the top washer 104. The use of a compressor similar to that of FIG. 10 will result in further compression of the washer 104 so that the disc is completely free of mechanical contact of covers 101 and 107.

Figures 13, 14:
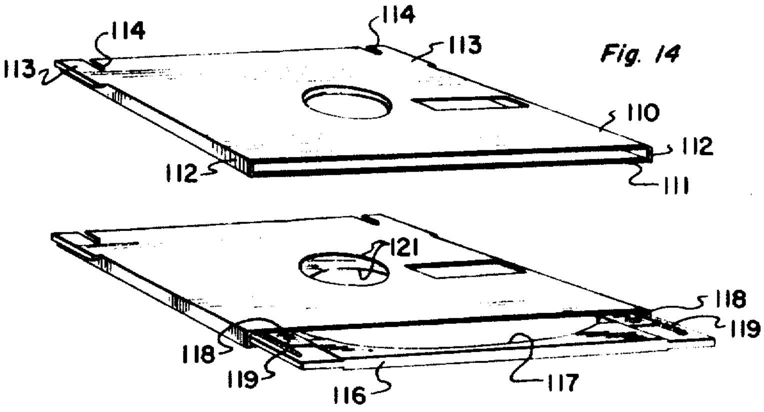
FIG. 13 is a three dimensional view of a modified form of the invention wherein the outer covers are in the form of an envelope.
FIG. 14 is a three dimensional view of the envelope of FIG. 13.

Referring to FIGS. 13 and 14 there is illustrated a modified form of cassette having an envelope wherein a top cover 110 is secured to a bottom cover 111 by sidewalls 112 and an end wall (not shown). The top cover 110 may have the usual guide flange 113 and both covers (and the end wall) may have the usual notches 114. Sliding into the envelope may be a spacer 116 having a circuit cutout 117 for receiving a disc. Mounted for reciprocation on the spacer are a pair of shutters 118 only one of which is shown, these may be biased by compression springs 119 disposed in slots in the spacer 116.

The design of FIGS. 13 and 14 lends itself to plastic moldings for the envelope and the spacer. At present it is desired to make the shutters 118 of metal but these also could be made of plastic. Plastic reduces the weight of the cassettes and in quantity reduces costs. The usual rigid and compressible washers may be disposed about center holes 121 by inserting them separately in the envelope before inserting the spacer 116 and the shutters 118. Also if desired the spacer 116 may be provided with ridges at the rear (to lower right in FIG. 13) to seal off the entire rear of the cassette when the spacer 116 is fully inserted in the envelope 110-111-112. As shown in FIG. 13 the spacer is only partly inserted in the envelope.

It will be appreciated by those skilled in the art that various modifications could be made without departing from the true spirit and scope of the invention. For example, if it is desired to give the shutters a greater degree of movement than that illustrated, they can cover the center opening 51 in the cassette, and thereby avoid the necessity of compression washers in so far as dust protection is concerned. It will be remembered that the washers serve the additional function of centering the disc in the cassette. Hinged covers or other removable covers could be used for this center section also, but I prefer the simplicity of the present design to such auxiliary devices. There is no limit, of course, on the number of windows that can be accommodated by my shutter design and the number of transducers. Portions of the shutters could project from the cassette to contact posts or stops of any kind to open the shutters. For these reasons the description and drawings are illustrative only and do not limit my invention.

I claim:

1. The combination of a disc cassette having outer covers and having a data disc with a spindle hole flange, and a disc processing machine comprising:
   a. a deck on the machine for supporting the disc cassette;
   b. a spindle projecting from the deck;
   c. central apertures in the cassette exposing the disc in the spindle flange region;
   d. a rigid washer disposed between the disc and each cassette cover and extending into the central opening;
   e. a compressible elastic washer disposed on each side of the disc around the central aperture and between the disc the rigid washers, and having an axial dimension large enough to press the rigid washers against the cassette covers to exclude dust;
   f. a rim on the spindle for engaging the rigid washer adjacent the deck;
   g. and a rotatable compressor for selectively engaging the rigid washer remote from the deck to thereby compress at least one elastic washer, whereby all washers are free from contact with the cassette so that the disc rotates freely on the spindle within the cassette when the cassette is supported by the deck.

2. The combination of claim 1 wherein the compressor engages the spindle for exerting a compressive force on at least one elastic washer.

3. The combination of claim 1 wherein the spacing between the deck and the spindle rim is such with respect to the cassette dimensions that the compressible washer adjacent to the deck is compressed to break mechanical contact between the cassette and the rigid washer closest to the deck when the cassette is supported by the deck.

4. The combination of claim 1 wherein the compressor engages the spindle for exerting its compressive force and has a releasable latch for removing the compressor from the spindle.

5. The combination of claim 1 wherein the compressible washers are strong enough to normally hold the disc out of contact with any other part of the cassette.

6. The combination of claim 1 wherein the cassette has a window, a shutter normally closing the window, and means interengaging the deck and shutter whereby the shutter opens the window when the cassette is placed on the deck with the disc mounted on the spindle.

7. The combination of claim 1 wherein the spindle has a portion that contacts the spindle hole flange of the disc so that the disc is directly supported by the spindle.

8. The combination of claim 1 wherein the spindle has a portion that contacts the spindle hole flange of the disc and the compressor has a portion that contacts the other side of the spindle hole flange of the disc, so that the disc is directly clamped to the spindle.

9. A cassette containing a data disc comprising:

a. a pair of spaced covers each having aligned central openings;

b. and a pair of aligned composite washers disposed between the covers around the central opening, each having a rigid surface in contact with its respective cover and each having an inner edge extending into the central opening of the respective covers, and each having a compressible, elastic body on the side away from their respective covers, and normally contacting the data disc to exclude dust.

10. A cassette containing a data disc and adapted to engage a pin comprising:

a. a pair of spaced covers each having central openings aligned with each other and a notch aligned with each other, and at least one having a processing window;

b. a sliding shutter beneath the cover having a window and the shutter normally extending into the aligned notches when the window is covered and sliding to uncover the window when it is not in the notch;

c. a spring normally urging the shutter to close the window and elastic enough to permit shutter movement to uncover the window;

d. and a pair of aligned composite washers disposed between the covers around the central opening, each having a rigid surface in contrast with its respective cover and each having an inner edge extending into the central opening of the covers, and each having a compressible, elastic body on the side away from the respective cover, and normally contacting the data disc to exclude dust.

11. The combination of a disc cassette having outer coverings and having a data disc with a spindle flange, and a disc processing machine comprising:

a. a deck on the machine for supporting the disc cassette;

b. central apertures in the cassette exposing both sides of the disc in the spindle flange region;

c. a rigid washer disposed between the disc and one cover of the cassette;

d. a compressible elastic washer disposed between the disc and the rigid washer;

e. a cushion disposed between the outer cassette cover and the disc;

f. a spindle projecting from the deck and having a flange for engaging one spindle flange surface of the data disc next to the deck, and engaging also the rigid washer when it is disposed next to the deck;

g. a rotatable compressor for engaging the other surface of the spindle flange of the disc and engaging the rigid washer when the cassette is placed on the processing machine with that rigid washer remote from the deck, and compressing the compressible washer to free the rigid washer from contact with its cassette cover, or to move the disc away from the cushion, characterized by the spacing between the deck and the spindle flange being such, with respect to the dimensions of the cassette, that the disc is lifted off of the cushion, or the compressible washer is partially compressed when the cassette is mounted on the deck and subsequent compression of the compressible washer breaks contact between the cassette and the rigid washer, or between cushion and disc, so that the disc can rotate freely in the cassette.

12. A cassette containing a data disc comprising:

a. a pair of parallel spaced covers having a central spindle opening and at least one having a processing window;

b. a perimeter spacer disposed between the covers defining a circular enclosure within which the data disc is placed and spacing said covers by a dimension greater than the transverse dimension of the disc and having a shutter guiding means;

c. at least one sliding shutter inside of and adjacent to the cover having a window, and extending substantially across said circular enclosure of the perimeter spacer and having a processing window opening and having a central spindle opening; and guided in said spacer guide means to slide in a plane parallel to said cover;

d. means for sliding said shutter to cover and open said processing window shutter central spindle opening and said cover central spindle openings being open at all times.

e. and means for centrally supporting a disc inside the cassette, whereby any cocking or wobble of the disc within the cassette will cause the disc to contact the shutter near the outer periphery of the disc and thereby avoid damaging the data bearing portions of the disc.